(12) United States Patent
Li

(10) Patent No.: US 12,744,641 B2
(45) Date of Patent: Sep. 22, 2026

(54) COMMUNICATION METHOD AND APPARATUS, AND DEVICE

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 301 days.

(21) Appl. No.: 18/294,820

(22) PCT Filed: Aug. 5, 2021

(86) PCT No.: PCT/CN2021/111050
§ 371 (c)(1),
(2) Date: Feb. 2, 2024

(87) PCT Pub. No.: WO2023/010484
PCT Pub. Date: Feb. 9, 2023

(65) Prior Publication Data

US 2024/0333454 A1 Oct. 3, 2024

(51) Int. Cl.
*H04L 5/00* (2006.01)
*H04W 48/10* (2009.01)
*H04W 68/02* (2009.01)

(52) U.S. Cl.
CPC .......... *H04L 5/0051* (2013.01); *H04L 5/0053* (2013.01); *H04W 48/10* (2013.01); *H04W 68/02* (2013.01)

(58) Field of Classification Search
CPC .... H04L 5/0051; H04L 5/0053; H04W 48/10; H04W 68/02; H04W 48/12; H04W 74/00; Y02D 30/70
See application file for complete search history.

(56) References Cited

U.S. PATENT DOCUMENTS

2021/0195452 A1 6/2021 Harada
2023/0012562 A1 * 1/2023 Liu ........................ H04W 52/52
2023/0022077 A1 * 1/2023 Liu ................... H04W 72/0446
(Continued)

FOREIGN PATENT DOCUMENTS

CN 112586077 A 3/2021
CN 113163474 A 7/2021
JP 2012-109954 A 6/2012

OTHER PUBLICATIONS

Xiaomi Communications,"3GPP TSG-RAN WG2 Meeting #113-bis electronic", R2-2102863, Online, Apr. 12-Apr. 20, 2021.
(Continued)

*Primary Examiner* — Abdullahi Ahmed
(74) *Attorney, Agent, or Firm* — Volpe Koenig

(57) ABSTRACT

A communication method, apparatus and computer readable storage medium that improves device performance in a wireless communication system. The device performance is improved by: a terminal device receiving broadcast system information; and the terminal device acquiring availability information of a specific reference signal from the system information according to an availability indication based on physical layer signaling, where the availability indication based on physical layer signaling refers to the terminal device acquiring the availability information by means of physical layer signaling.

20 Claims, 4 Drawing Sheets

(56) References Cited

U.S. PATENT DOCUMENTS

| | | | | |
|---|---|---|---|---|
| 2023/0155766 | A1* | 5/2023 | Ren | H04L 5/0048 370/330 |
| 2024/0007252 | A1* | 1/2024 | He | H04W 48/08 |
| 2024/0187988 | A1* | 6/2024 | Maleki | H04W 52/0216 |
| 2024/0235785 | A1* | 7/2024 | Maleki | H04L 5/0053 |
| 2024/0381307 | A1* | 11/2024 | Reial | H04W 68/005 |

OTHER PUBLICATIONS

Moderator (Samsung), "Final summary for TRS/CSI-RS occasion(s) for idle/inactive UEs", 3GPP TSG RAN WG1 #105-e, R1-2106117May 27, 2021, pp. 2, 10 and 22.

Moderator (Samsung), "1st Summary for TRS/CSI-RS occasion(s) for idle/inactive UEs", 3GPP TSG RAN WG1 #105-e, R1-2105323, May 27, 2021, pp. 2 and 10.

* cited by examiner

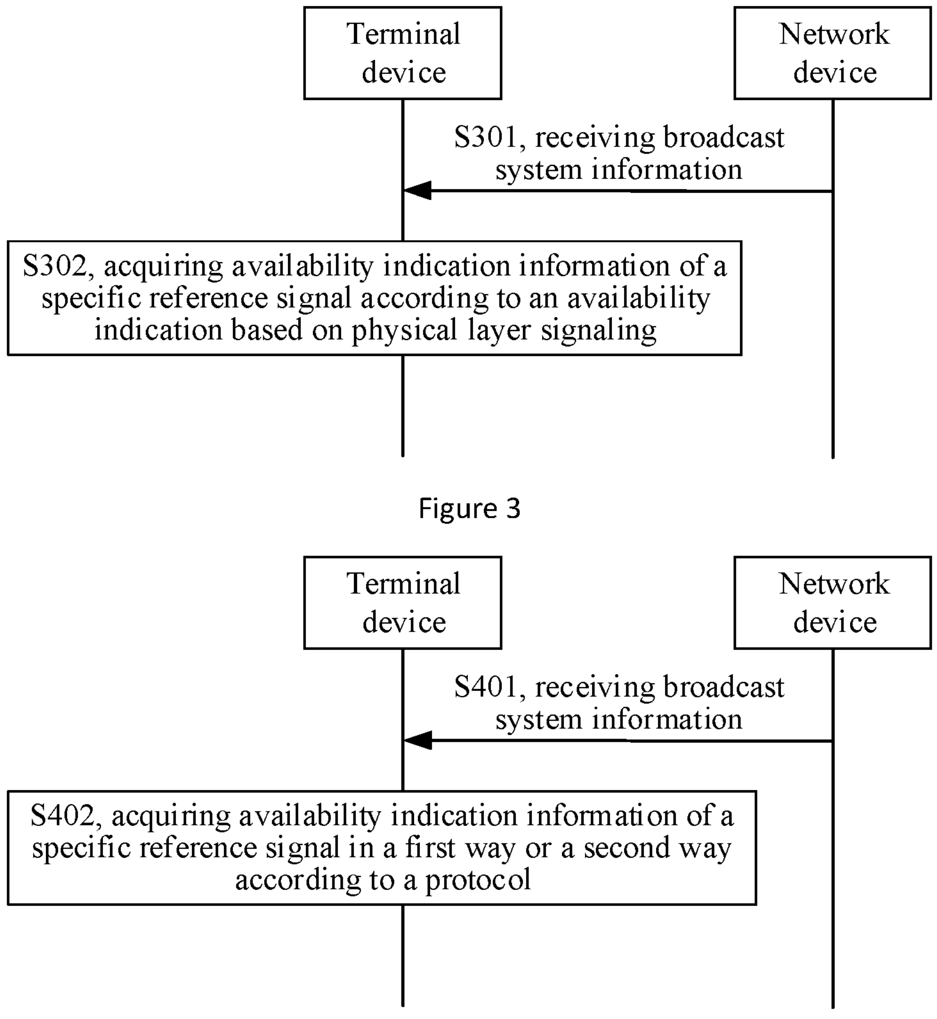
Figure 3
Figure 4
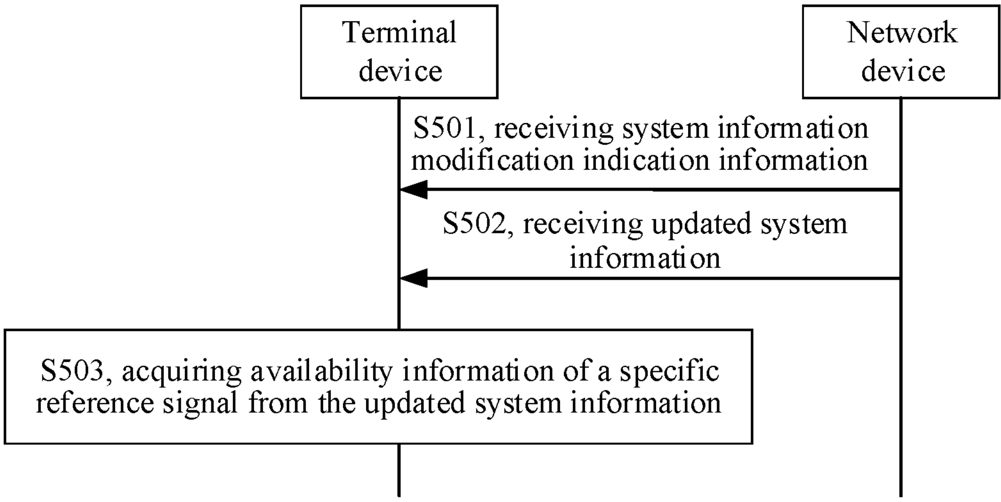
Figure 5

COMMUNICATION METHOD AND APPARATUS, AND DEVICE

CROSS REFERENCE TO RELATED APPLICATION

The present application is a U.S. National Stage of International Application No. PCT/CN2021/111050, filed on Aug. 5, 2021, the entire content of which is incorporated herein by reference for all purposes.

BACKGROUND OF THE INVENTION

In a wireless communication system, a terminal device in an idle state may use specific reference signals (e.g., a tracking reference signal (TRS), a channel state information reference signal (CSI-RS), etc.) to assist the terminal device in acquisition and time-frequency domain synchronization of the network and automatic gain control (AGC) adjustment. Compared to synchronization based on synchronization signal and PBCH block (SSB), the TRS/CSI-RS can be configured closer to the paging occasion (PO), and the terminal device can wake up later, thus being more power-saving.

SUMMARY OF THE INVENTION

In a first aspect, the disclosure provides a communication method, which may be performed by a terminal device in a communication system. The method may include: receiving, by a terminal device, broadcast system information; and acquiring, by the terminal device, availability information of a specific reference signal from the system information according to an availability indication based on physical layer signaling, where the availability indication based on physical layer signaling refers that the terminal device acquires the availability information of the specific reference signal by means of physical layer signaling.

In a second aspect, the disclosure provides a communication method, which can be performed by a terminal device in a communication system. The method may include: receiving, by a terminal device, broadcast system information; and determining, by the terminal device, availability information of a specific reference signal according to third information in the system information, where the third information is used to indicate an initial activation state of configuration information of the specific reference signal; or, determining, by the terminal device, the availability information of the specific reference signal according to whether the configuration information is configured in the system information.

In a third aspect, the disclosure provides a terminal device including: a memory; a processor, connected with the memory, configured to execute computer-executable instructions stored on the memory to implement the communication method according to any one of the first aspect, the second aspect, and possible implementations.

In a fourth aspect, the disclosure provides a non-transitory computer-readable storage medium including: a processing module configured to execute computer-executable instructions stored on the non-transitory computer-readable storage medium to implement the communication method according to any one of the first aspect, the second aspect, and possible implementation.

BRIEF DESCRIPTION OF DRAWINGS

FIG. 3 is a flow chart of another communication method according to an example of the disclosure.

FIG. 4 is a flow chart of yet another communication method according to an example of the disclosure.

FIG. 5 is a flow chart of yet another communication method according to an example of the disclosure.

DETAILED DESCRIPTION OF THE INVENTION

Figure 1:
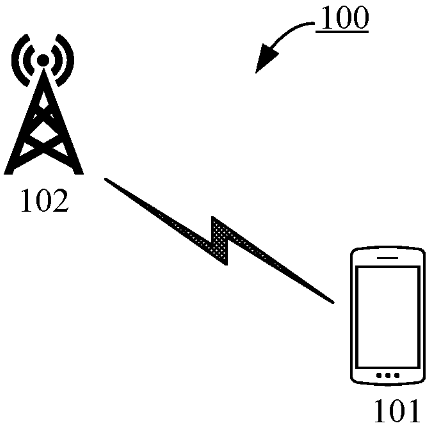
FIG. 1 is a schematic structural diagram of a communication system according to an example of the disclosure.

Examples will be described in detail, instances of which are represented in the drawings. In the following description, when the same numbers appear in different drawings, the numbers represent the same or similar elements unless otherwise stated. The implementations described in the following examples do not represent all implementations consistent with the disclosed examples. Rather, they are merely examples of apparatuses and methods consistent with some aspects of the disclosure as detailed in the appended claims.

The terms used in the examples of the disclosure are only intended to describe particular examples, and are not intended to limit the examples of the disclosure. As used in the examples of the disclosure and the appended claims, the singular forms "a," "an," and "the" are intended to include the plural forms, unless the context clearly indicates otherwise. It is understood that the term "and/or" used here refers to and includes any or all possible combinations of one or more associated listed items.

It is understood that although the terms "first," "second," "third," etc., may be employed in examples of the disclosure to describe various pieces of information, such pieces of information are not limited to these terms. These terms are only used to distinguish the same type of information from each other. For example, "first information" could also be termed "second information," and similarly, "second information" could also be termed "first information" without departing from the scope of examples of the disclosure. Depending on the context, the word "if," as used herein, may be interpreted as "when," "while," or "in response to determining."

The disclosure relates to the technical field of wireless communication, and in particular, to a communication method, apparatus, and device.

In a wireless communication system, a terminal device in an idle state may use specific reference signals (e.g., a tracking reference signal (TRS), a channel state information reference signal (CSI-RS), etc.) to assist the terminal device in acquisition and time-frequency domain synchronization of the network and automatic gain control (AGC) adjustment. Compared to synchronization based on synchronization signal and PBCH block (SSB), the TRS/CSI-RS can be configured closer to the paging occasion (PO), and the terminal device can wake up later, thus being more power-saving.

Currently, the configuration information of the TRS/CSI-RS and the state information whether the TRS/CSI-RS is being broadcasted or not (which can also be understood as availability information of the TRS/CSI-RS, available state information of the TRS/CSI-RS, etc.) is broadcasted in the system information, so that the terminal device can accurately decide how to synchronize with the network device. Since the configuration information of the TRS/CSI-RS and the availability information of the TRS/CSI-RS are separately indicated, the terminal device can acquire the configuration information of the TRS/CSI-RS from the system information, but how the terminal device acquires the availability information of the TRS/CSI-RS becomes a problem to be solved.

The disclosure provides a communication method and apparatus, and a device, to enable a terminal device to acquire the availability information of the TRS/CSI-RS.

In a first aspect, the disclosure provides a communication method, which may be performed by a terminal device in a communication system. The method may include: receiving, by a terminal device, broadcast system information; and acquiring, by the terminal device, availability information of a specific reference signal from the system information according to an availability indication based on physical layer signaling, where the availability indication based on physical layer signaling refers that the terminal device acquires the availability information of the specific reference signal by means of physical layer signaling.

In the disclosure, the above-mentioned specific reference signal is used to assist a terminal device in time-frequency domain synchronization with a network device; in response to determining that the specific reference signal has been configured, and the configuration information of the specific reference signal is initial activation, then the availability information indicates that the specific reference signal is available; in response to determining that the specific reference signal is not configured, or the configuration information of the specific reference signal is initial deactivation, then the availability information indicates that the specific reference signal is not available.

In some possible implementations, the above method further includes: receiving, by the terminal device, indication information from the network device, the indication information being used to indicate whether the availability indication based on the physical layer signaling is enabled; or, determining, by the terminal device, whether a paging early indicator (PEI) is configured in the system information, the PEI being used to indicate whether the availability indication based on the physical layer signaling is enabled; or, determining, by the terminal device, whether first information is present in the system information, the first information being used to indicate that the availability indication based on the physical layer signaling is enabled.

In some possible implementations, in response to determining that the availability indication based on the physical layer signaling is enabled, acquiring, by the terminal device, the availability information of the specific reference signal from the system information according to the availability indication based on the physical layer signaling, includes: determining, by the terminal device, the availability information of the specific reference signal according to second information in the system information, where the second information is used to indicate an initial activation state of the configuration information of the specific reference signal.

In some possible implementations, the system information includes: a system information block SIB1 and/or SIBx for carrying configuration information of the specific reference signal, x being an integer greater than or equal to 2, where the second information is carried in the SIB1 or the SIBx.

In the disclosure, the first information may be the same as the second information or may be different.

In some possible implementations, in response to determining that an availability indication based on the physical layer signaling is disabled, the method further includes: determining, by the terminal device, the availability information of the specific reference signal according to whether the configuration information is configured in the system information.

In some possible implementations, determining, by the terminal device, the availability information of the specific reference signal according to whether the configuration information is configured in the system information, includes: in response to determining that the configuration information is configured in the system information, determining, by the terminal device, that the specific reference signal is configured in the system information, and the configuration information of the specific reference signal is initial activation; or, in response to determining that the configuration information is configured in the system information, determining, by the terminal device, that the specific reference signal is configured in the system information, and the configuration information of the specific reference signal is initial deactivation; or, in response to determining that the configuration information is not configured in the system information, determining, by the terminal device, that the configuration information of the specific reference signal is initial deactivation.

In some possible implementations, the physical layer signaling carries a paging downlink control indicator (DCI) or PEI, and the availability indication based on the physical layer signaling is an availability indication based on the DCI or PEI.

In some possible implementations, before the terminal device receives the broadcast system information, the method further includes: receiving, by the terminal device, system information update indication information from a network device, the system information update indication information being used to indicate that the availability indication based on the physical layer signaling is enabled or disabled.

In some possible implementations, the specific reference signal is a tracking reference signal (TRS) or a channel state information reference signal (CSI-RS).

In a second aspect, the disclosure provides a communication method, which can be performed by a terminal device in a communication system. The method may include: receiving, by a terminal device, broadcast system information; and determining, by the terminal device, availability information of a specific reference signal according to third information in the system information, where the third information is used to indicate an initial activation state of configuration information of the specific reference signal; or, determining, by the terminal device, the availability information of the specific reference signal according to whether the configuration information is configured in the system information.

In some possible implementations, the third information is a bitmap or a code point in the system information.

In the disclosure, the third information may be the same as the second information described above.

In some possible implementations, determining, by the terminal device, the availability information of the specific reference signal according to whether the configuration information is configured in the system information, includes: in response to determining that the configuration information is configured in the system information, determining, by the terminal device, that the specific reference signal is configured in the system information, and the configuration information of the specific reference signal is initial activation; or, in response to determining that the configuration information is configured in the system information, determining, by the terminal device, that the specific reference signal is configured in the system information, and the configuration information of the specific reference signal is initial deactivation; or, in response to determining that the configuration information is not configured in the system information, determining, by the terminal device, that the configuration information of the specific reference signal is initial deactivation.

In some possible implementations, the specific reference signal is a tracking reference signal (TRS) or a channel state information reference signal (CSI-RS).

In a third aspect, the disclosure provides a communication apparatus, which may be a terminal device, a chip, or a system-on-chip in a terminal device in the communication system as described, and may be a functional module in a terminal device for implementing the method of the first aspect as described above. The communication apparatus may implement the functions performed by the terminal device of the first aspect described above, and these functions may be implemented through hardware by executing corresponding software. Such hardware or software includes one or more modules corresponding to the functions described above. The communication apparatus includes: a first receiving module, used to receive broadcast system information; and a first processing module, used to acquire availability information of a specific reference signal from the system information according to an availability indication based on physical layer signaling, where the availability indication based on the physical layer signaling refers that the terminal device acquires the availability information of the specific reference signal by means of the physical layer signaling.

In some possible implementations, the first receiving module is further used to receive indication information from the network device, and the indication information is used to indicate whether the availability indication based on the physical layer signaling is enabled.

In some possible implementations, the first processing module is further used to determine whether a paging early indicator (PEI) is configured in the system information, the PEI being used to indicate whether the availability indication based on the physical layer signaling is enabled; or determine whether first information is present in the system information, the first information is used to indicate that the availability indication based on the physical layer signaling is enabled.

In some possible implementations, the first processing module is used to determine the availability information of the specific reference signal according to second information in the system information in response to determining that the availability indication based on the physical layer signaling is enabled, where the second information is used to indicate an initial activation state of configuration information of the specific reference signal.

In some possible implementations, the first processing module is further used to determine the availability information of the specific reference signal according to whether the configuration information is configured in the system information in response to determining that the availability indication based on the physical layer signaling is disabled.

In some possible implementations, the first processing module, is used to, in response to determining that the configuration information is configured in the system information, determine that the specific reference signal is configured in the system information, and the configuration information of the specific reference signal is initial activation; or, in response to determining that the configuration information is configured in the system information, determine that the specific reference signal is configured in the system information, and the configuration information of the specific reference signal is initial deactivation; or, in response to determining that the configuration information is not configured in the system information, determine that the configuration information of the specific reference signal is initial deactivation.

In some possible implementations, the first receiving module is further used to receive system information update indication information from a network device before receiving the system information, the system information update indication information being used to indicate that the availability indication based on the physical layer signaling is enabled or disabled.

In some possible implementations, the specific reference signal is a TRS or a CSI-RS.

In a fourth aspect, the disclosure provides a communication apparatus, which may be a terminal device, a chip, or a system-on-chip in a terminal device in the communication system as described, and may be a functional module in a terminal device for implementing the method of the second aspect as described above. The communication apparatus may implement the functions performed by the terminal device of the second aspect described above, and these functions may be implemented through hardware by executing corresponding software. Such hardware or software includes one or more modules corresponding to the functions described above. The communication apparatus includes: a second receiving module, used to receive broadcast system information; a second processing module, used to determine availability information of a specific reference signal according to third information in the system information, where the third information is used to indicate an initial activation state of configuration information of the specific reference signal; or determine the availability information according to whether the configuration information is configured in the system information.

In some possible implementations, the third information is a bitmap or a code point in the system information.

In some possible implementations, the second processing module, is used to, in response to determining that the configuration information is configured in the system information, determine that the specific reference signal is configured in the system information, and the configuration information of the specific reference signal is initial activation; or, in response to determining that the configuration information is configured in the system information, determine that the specific reference signal is configured in the system information, and the configuration information of the specific reference signal is initial deactivation; or, in response to determining that the configuration information is not configured in the system information, determine that the configuration information of the specific reference signal is initial deactivation.

In a fifth aspect, the disclosure provides a terminal device including: a memory; a processor, connected with the memory, configured to execute computer-executable instructions stored on the memory to implement the communication method according to any one of the first aspect, the second aspect, and possible implementations.

In a sixth aspect, the disclosure provides a non-transitory computer-readable storage medium including: a processing module configured to execute computer-executable instructions stored on the non-transitory computer-readable storage medium to implement the communication method according to any one of the first aspect, the second aspect, and possible implementations.

In the disclosure, the terminal device may acquire the availability information of a specific reference signal based on the availability indication based on the physical layer signaling, thus allowing the terminal device to select a more appropriate way to synchronize with the network device and improve device performance.

It is understood that the third to sixth aspects of the disclosure are consistent with the technical solutions of the first to second aspects of the disclosure, and the advantageous effects achieved by the various aspects and the corresponding possible implementations are similar, and will not be repeated.

An example of the disclosure provides a communication system. The communication system may be based on cellular mobile communication technology. FIG. 1 is a schematic structural diagram of a communication system according to an example of the disclosure. Referring to FIG. 1, the communication system 100 may include a terminal device 101 and a network device 102.

In an example, the terminal device 101 may be a device that provides voice or data connectivity to a user. In some examples, the terminal device may also be referred to as user equipment (UE), a mobile station, a subscriber unit, a station, or a terminal device (TE), etc. The terminal device may be a cellular phone, a personal digital assistant (PDA), a wireless modem, a handheld device, a laptop computer, a cordless phone, a wireless local loop (WLL) station, a pad, or the like. With the development of wireless communication technology, devices that can access the wireless communication system, can communicate with the network side of the wireless communication system, or communicate with other devices through the wireless communication system, are all terminal devices in the examples of the disclosure. For example, the terminal devices include terminals and automobiles in intelligent traffic, household appliances in smart homes, electric power meter reading instruments in smart grids, voltage monitoring instruments, environmental monitoring instruments, video monitoring instruments in intelligent complete networks, cash registers, and the like. In an example of the disclosure, a terminal device may communicate with a network device, and communication can also be performed between a plurality of terminal devices. The terminal device may be statically fixed or may be mobile.

The network device 102 described above may be a device on the access network side for supporting terminal access to a wireless communication system. For example, it may be an evolved NodeB (eNB) in a 4G access technology communication system, a next-generation NodeB (gNB) in a 5G access technology communication system, a transmission reception point (TRP), a relay node, an access point (AP), etc.

In the above-described communication system, a terminal device in an idle state may use a specific reference signal (e.g., a tracking reference signal (TRS), a channel state information reference signal (CSI-RS), etc.) to assist the terminal device in acquisition and time-frequency domain synchronization of the network. In contrast to synchronization based on the synchronization signal and PBCH block (SSB), the TRS/CSI-RS may be configured closer to the paging occasion (PO), while the configured location of the SSB is farther from the PO. Thus, it is necessary for a terminal device in an idle state to wake up much earlier in advance in order to perform SSB-based synchronization. Whereas, if TRS/CSI-RS based synchronization is performed, the terminal device in the idle state can wake up later, thus being more power-saving.

In practice, the terminal device may decide how to synchronize with the network device according to the valid TRS/CSI-RS. For example, if the network device sends the valid TRS/CSI-RS, and the terminal device considers that the network device does not send the valid TRS/CSI-RS, the terminal device will still synchronize based on the SSB, resulting in greater power consumption; if the network device does not send the valid TRS/CSI-RS and the terminal device still synchronizes based on the TRS/CSI-RS, this results in a reduced synchronization accuracy.

In order to avoid the above problems from occurring, the configuration information of the TRS/CSI-RS and the state information of whether the TRS/CSI-RS is being broadcasted or not (which can also be understood as availability information of the TRS/CSI-RS, available state information of the TRS/CSI-RS, etc.) is broadcasted in the system information, so that the terminal device can accurately decide how to synchronize with the network device. Since the configuration information of the TRS/CSI-RS and the availability information of the TRS/CSI-RS are separately indicated, the terminal device can acquire the configuration information of the TRS/CSI-RS from the system information, but how the terminal device acquires the availability information of the TRS/CSI-RS becomes a problem to be solved.

In order to solve the above problem, an example of the disclosure provides a communication method, which can be performed by a terminal device in the above communication system.

Figure 2:
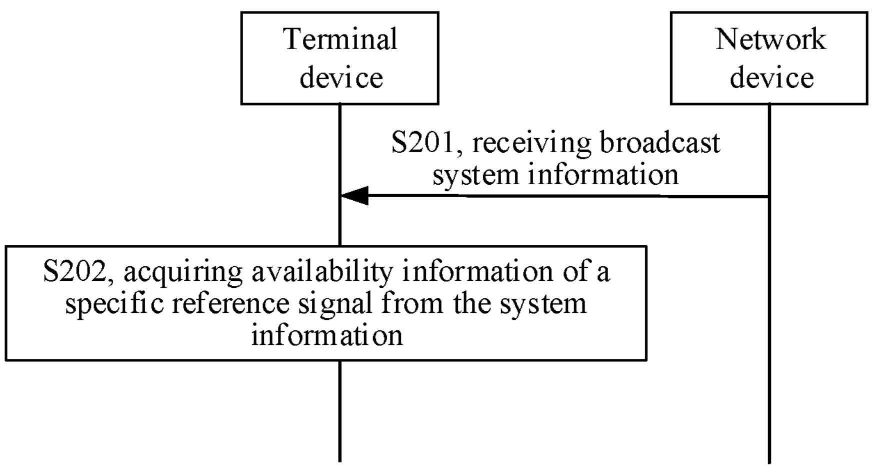
FIG. 2 is a flow chart of a communication method according to an example of the disclosure.

FIG. 2 is a flow chart of a communication method according to an example of the disclosure. As shown in FIG. 2, the communication method may include steps S201 and S202.

In S201, a terminal device receives system information broadcast by a network device.

The system information may include a system information block (SIB) 1 and a SIBx (x may be an integer greater than or equal to 2). In an example, the SIBx may be dedicated to carrying configuration information for a specific reference signal.

The specific reference signal may be, for example, a TRS, a CSI-RS, or the like, for assisting the terminal device in time-frequency domain synchronization with the network device.

In S202, the terminal device acquires availability information of a specific reference signal from the system information.

In response to determining that the network device is configured with a particular reference signal and the configuration information for the particular reference signal is initial activation, the availability information indicates that the particular reference signal is available to the terminal device, and the network device expects the terminal device to use. In response to determining that the network device is not configured with the specific reference signal, or the configuration information of the specific reference signal is initially deactivated, then the availability information indicates that the specific reference signal is unavailable to the terminal device, and the network device does not expect the terminal device to use it.

In an example, the terminal device may obtain availability information for one or more specific reference signals based on the system information. The availability information of one or more specific reference signals may be carried in SIB1 or SIBx.

It is understood that, after receiving the system information on the broadcast channel according to the configuration information of the system information, the terminal device detects whether the configuration information of the specific reference signal is present in the system information. If the configuration information for the specific reference signal is detected, it is stated that the network device is configured with the specific reference signal; on the contrary, it is stated that the network device is not configured with a specific reference signal. Further, the terminal device may also determine from the system information whether the configuration information of the specific reference signal is for initial activation.

In some possible implementations, the network device may indicate whether the configuration information of a specific reference signal is initially activated by configuring a bitmap or a code point (e.g., the first information) in the system information. Then, the terminal device may acquire the availability information of the specific reference signal by reading the bitmap or code point to confirm whether the configuration information of the specific reference signal is for initial activation. For example, the bitmap or code point may be carried in the SIB1 or SIBx.

In some possible examples, in S202, the terminal device, according to an indication of the network device or a protocol, may acquire the availability information of a specific reference signal in the following two ways, and it is not limited to the two ways: a first way, the terminal device may acquire the availability information of the specific reference signal according to the first information (or the second information or the third information) in the system information. For example, the terminal device may read the above-described bitmap or code point from the system information to determine whether the configuration information of the specific reference signal is for initial activation, and thus determine the availability information of the specific reference signal. A second way, the terminal device may acquire the availability information of the specific reference signal according to the configuration situation of the specific reference signal in the system information. For example, the terminal device determines whether the configuration information of the specific reference signal is for initial activation according to whether the configuration information of the specific reference signal is carried in the system information, thus determining the availability information of the specific reference signal.

The terminal device may, for example, read the availability information of the configuration resource according to a network device indication or a protocol-agreed way. As an example, the configuration resource is the configuration information of the TRS/CSI-RS, and can also be understood as the TRS/CSI-RS; as an example, the availability information of the configuration resource is expressed as an activation state or a deactivation state of the resource; the activation state: i.e., the configuration of the resource is present and is initial activation; that is available to the terminal device at this time; the network device expects the terminal device to use; the deactivation state: i.e., the configuration of the resource is not present, or the configuration of the resource is reasonably present but is initial deactivation; that is not available to the terminal device at this time; and the network device does not expect the terminal device to use.

In some possible implementations, the network device can inform the terminal device of the availability information of the specific reference signal based on the physical layer signaling (can also be referred to as an availability indication based on the physical layer signaling). However, there may be two states, enable and disable, of the availability indication based on the physical layer signaling. Accordingly, FIG. 3 is a flow chart of another communication method according to an example of the disclosure. As shown in FIG. 3, the communication method may include steps S301 and S302.

In S301, a terminal device receives broadcast system information by a network device.

It is understood that the specific implementation of S301 can be referred to the description of S201 in FIG. 2, and will not be described in detail here.

In S302, the terminal device acquires availability information of a specific reference signal according to an availability indication based on physical layer signaling.

It is understood that the network device may configure the availability indication based on physical layer signaling to be enabled or disabled. Accordingly, the terminal device may determine whether the availability indication based on the physical layer signaling is enabled according to the indication of the network device, thus performing the steps of determining the availability information of the specific reference signal in the following examples. Here, the enabled availability indication based on the physical layer signaling may be understood as that the network device indicates that the physical layer signaling is configured and enabled, or the network device indicates that the physical layer signaling is configured; disabled availability indication based on the physical layer signaling may be understood as that the network device indicates that the physical layer signaling is configured and disabled, or the network device indicates that the physical layer signaling is not configured.

Optionally, in the first case, the terminal device may receive indication information sent by the network device, and the indication information may be used to indicate whether the above-mentioned availability indication based on the physical layer signaling is enabled. At this time, the indication information may be one flag in the physical layer signaling. If the value of the flag is true, this indicates that the availability indication based on the physical layer signaling is enabled (i.e., enable L1 based availability indication); if the value of the flag is false, it indicates that the availability indication based on the physical layer signaling is disabled (i.e., disable L1 based availability indication).

Further, in practical applications, the above-mentioned physical layer signaling may be used to carry a paging downlink control indicator (DCI) or a paging early indicator (PEI). The above-mentioned availability indication based on the physical layer signaling may, in particular, be a DCI or PEI based availability indication. The above indication information may then be used to indicate whether the DCI or PEI-based availability indication is enabled. At this time, the indication information may be a flag in the physical layer signaling. The value of the flag is true, which indicates that a DCI or PEI-based availability indication is enabled (i.e., enable Paging DCI/PEI based availability indication); the value of the flag is false, which indicates that a DCI or PEI-based availability indication is disabled (i.e., disable Paging DCI/PEI based availability indication).

It is noted that in the first case, the indication information may be carried in system information, such as in the SIB1 or SIBx; it may also be carried in dedicated signaling, such as a radio resource control (RRC) release message. Preferably, the indication information is carried in the SIBx.

In the second case, the terminal device may determine whether the PEI is configured in the system information, and the PEI is used to indicate whether the PEI-based availability indication is enabled. If the terminal device determines that the PEI is configured in the system information, the terminal device may determine that the PEI-based availability indication is enabled. If the terminal device determines that the PEI is not configured in the system information, the terminal device may determine whether an availability indication based on the physical layer signaling is enabled according to the example described in the first case above.

In the third case, the terminal device may determine whether the first information is present in the system information (which may also be understood as whether or not the first information is configured), the presence (i.e., configuration) of the first information may then indicate that the availability indication based on the physical layer signaling is enabled, or otherwise, it indicates that the availability indication based on the physical layer signaling is disabled. Optionally, an optional field (e.g., TRS-status BIT STRING (SIZE (4))), i.e., the first information, may be configured in the SIBx. If this field is configured, it indicates that the first information is present (i.e., configured) in the system information, the availability indication based on the physical layer signaling is enabled; conversely, if the field is not configured, it indicates that the first information is not present (i.e., not configured) in the system information, the availability indication based on the physical layer signaling is disabled.

In some possible implementations, in response to determining that the availability indication based on the physical layer signaling is enabled, the terminal device may acquire the availability information of the specific reference signal in a first way. For example, to determine the availability information of the specific reference signal according to first information in the system information (such as the above-mentioned bitmap or code point). It may be understood that the terminal device determines the availability information of the specific reference signal according to the indication of the network device. In an example, in the event that the availability indication based on the physical layer signaling is enabled, the configuration information of a specific reference signal has been configured by default. The terminal device may read the above-described bitmap or code point from the system information to determine whether the configuration information of the specific reference signal is for initial activation. If the above bitmap or code point indicates that the configuration information of a specific reference signal is initial activation, it indicates that the configuration information of a specific reference signal has been configured by default, and the configuration information of a specific reference signal is initial activation. At this time, the terminal device may determine that the availability information of the specific reference signal is available. If the above bitmap or code point indicates that the configuration information of a specific reference signal is initial deactivation, it means that the configuration information of the specific reference signal has been configured by default, but the configuration information of the specific reference signal is initial deactivation. At this time, the terminal device may determine that the availability information of the specific reference signal is not available. For example, the configuration information of four specific reference signals that have been configured is included in the system information, and if the bitmap or code point is 0101, it indicates that the configuration information of the second specific reference signal and the configuration information of the fourth specific reference signal are initially activated. At this point, the terminal device may determine that the second specific reference signal and the fourth specific reference signal are available.

In other possible implementations, in response to determining that the availability indication based on the physical layer signaling is disabled, the terminal device may acquire the availability information of the specific reference signal in a second way, i.e., determine the availability information of the specific reference signal according to whether configuration information is configured in the system information. In an example, in the event that the availability indication based on the physical layer signaling is disabled, the terminal device may determine whether the configuration information of a specific reference signal is carried in the system information (e.g., the SIBx) and determine the availability information of the specific reference signal. It may be understood here that the terminal device determines the availability information of a specific reference signal according to an indication or protocol of the network device, for example, as specified by the protocol, if the configuration information for a specific reference signal is carried in the SIBx, the terminal device may determine that the specific reference signal is configured, and the configuration information for the specific reference signal is initial activation; or, if the configuration information for a specific reference signal is carried in the SIBx, the terminal device may determine that the specific reference signal is configured, and the configuration information for the specific reference signal is initial deactivation; furthermore, if the configuration information for the specific reference signal is not carried in the SIBx, the terminal device may determine that the configuration information for the specific reference signal is initial deactivation.

In some possible implementations, the terminal device can also determine the availability information of a specific reference signal by acquiring scheduling information of system information (e.g., the SIBx) in the event that the availability indication based on the physical layer signaling is disabled, as specified by the protocol. For example, if scheduling information for the SIBx is present (or configured) in a broadcast channel (e.g., a master information block (MIB)), the terminal device may determine that the configuration information for all specific reference signals carried in the SIBx is initial activation; conversely, the terminal device may determine that the configuration information for all specific reference signals carried in the SIBx is initial deactivation.

In some possible implementations, in the event that the availability indication based on the physical layer signaling is disabled, since the terminal device determines the availability information of the specific reference signal according to whether the configuration information is configured in the system information, then the field used to carry the first information in the system information can be nulled or zeroed.

It is understood that, in light of the above, the terminal device may determine the activation state of the configuration information of the specific reference signal according to a granularity per particular reference signal or a granularity per system information.

For example, on the basis of the above-described example of FIG. 2, the terminal device can read the availability information of the configuration resource according to how the network device indicates adoption. As an example, the indication informs the user in the SIB1 or SIB-X: As an example, the indication informs the user in dedicated signaling, such as an RRC release message: as a preferred example, the indication is placed in the SIB-x.

Or, as an example, the above indication is used to indicate a notification way of the physical layer (lay1) (i.e., an availability indication based on physical layer signaling); as an example, the indication is a flag; flag=true indicates enable L1 based availability indication. For example, the notification way of the physical layer is enabled; flag=false indicates disable L1 based availability indication. For example, the notification way of the physical layer is disabled.

Further, as an example, the indication is a flag indicating whether the notification way of the paging DCI/PEI is enabled; flag=true indicates enable Paging DCI/PEI based availability indication. For example, the notification way of the paging DCI/PEI is enabled; flag=false indicates disable Paging DCI/PEI based availability indication. For example, the notification way of the paging DCI/PEI is disabled.

Or, as an example, the indication may be an implicit indication. If the system supports the PEI (i.e., PEI related parameters are configured), it is implicit to indicate that the PEI notification way has been enabled: if the system does not support the PEI way, there may be an indication (i.e., the flag described above).

Further, whether the notification way of the physical layer is enabled may be indicated by whether a bitmap or a code point (i.e., first information) indicating an activation state of the configuration resource is present or is configured. (Here, the presence of a bitmap necessitates that the notification way of the physical layer is enabled). For example, configuring an optional field (e.g., TRS-status BIT STRING (SIZE (4)) optional) in the SIBx means that the notification way of the physical layer is enabled, otherwise it is disabled.

In an example, if the notification way of the physical layer is configured to be enabled or is configured, the terminal device obtains the availability information of the configuration resource according to a bitmap or a code point in the system information for indicating the activation state of the configuration resource; optionally, the bitmap or code point may be placed in the SIB1; or, the bitmap or code point may be placed in the SIB-x; the SIB-x is a system information block where the configuration information of the specific reference signal TRS/CSI-RS is placed; or, the bitmap or code point is used to indicate availability of the configuration resource. For example, 0101 means that the 2nd and 4th sets of resources are activated.

In another example, if the notification way of the physical layer is configured to be disabled or is not configured, the terminal device decides the availability information of the configuration resource according to the configuration information in the system information; as one example: the presence of certain TRS/CSI-RS resource configuration information in the SIBx means that the resource is configured and activated; as one example: the presence of certain TRS/CSI-RS resource configuration information in the SIBx means that the resource is configured but initially not activated; as one example: the absence of certain TRS/CSI-RS resource configuration information in the SIBx means that the resource is not activated; in addition, the presence of scheduling information for the SIBx means that the resource is activated, otherwise it is not activated; (the granularity per resource cannot be made at this point).

Further, a bit indicating a bitmap or a code point for indicating an activation state of the configuration resource in the system information is a 0 bit.

In some other possible implementations, FIG. 4 is a flow chart illustrating yet another communication method according to an example of the disclosure. In referring to FIG. 4, the communication method may include steps S401 and S402.

In S401, a terminal device receives broadcast system information from a network device.

In S402, the terminal device acquires availability information of a specific reference signal in a first way or a second way as specified by a protocol.

In an example of the disclosure, the terminal device may self-determine the availability information of a specific reference signal without determining whether the availability indication based on the physical layer signaling is enabled, so that the terminal device may choose a more appropriate way to synchronize with the network device, thus improving device performance.

It is noted that the details of the terminal device acquiring the availability information of the specific reference signal in the first way or the second way in S402 can be found in the above description of S202 in FIGS. 2 and S302 in FIG. 3, and will not be repeated here.

For example, on the basis of the above-described example of FIG. 2, the terminal device reads the availability information of the configuration resource according to the protocol agreed way. As an example, the terminal device obtains the availability information of the configuration resource from a bitmap or a code point indicating the activation state of the configuration resource in the system message according to the protocol agreed way.

Further, the terminal device acquires the availability information of the configuration resource from a bitmap or a code point indicating an activation state of the configuration resource in the system message, regardless of whether the notification way for indicating the physical layer is enabled.

As another example, the terminal device determines the availability information of the configuration resource based on the configuration information in the system message according to the protocol agreed way.

In some other possible implementations, FIG. 5 is a flowchart illustrating yet another communication method according to an example of the disclosure. In referring to FIG. 5, the method may include steps S501-S503.

In S501, the terminal device receives system information modification indication information sent by the network device.

The system information modification indication information is used to indicate that an availability indication based on physical layer signaling is enabled or disabled.

In S502, the terminal device receives updated system information.

In S503, the terminal device acquires availability information of a specific reference signal from the updated system information.

It is understood that, in S501 to S503, the network device, after updating the system information, may send system information modification indication information to the terminal device to indicate to the terminal device whether the availability indication based on the physical layer signaling is enabled. The terminal device then acquires new system information in the following modification period (MP).

Next, the terminal device acquires availability information of the specific reference signal according to the indication of the system information modification indication information and the updated system information.

In an example, prior to S501, if the terminal device acquires the availability information of the specific reference signal in a first way according to an indication of the network device or a protocol. Then, if the system information modification indication information is enabled based on the availability indication of the physical layer signaling, the terminal device still acquires the availability information of the specific reference signal in the first way; if the system information modification indication information indicates that the availability indication based on the physical layer signaling is disabled, the terminal device changes to acquire the availability information of the specific reference signal in the second way. Similarly, before S501, if the terminal device acquires the availability information of the specific reference signal in a second way according to an indication of the network device or a protocol, then, if the system information modification indication information is enabled based on the availability indication of the physical layer signaling, the terminal device changes to acquire the availability information of the specific reference signal in the first way; if the system information modification indication information indicates that the availability indication based on the physical layer signaling is disabled, the terminal device still acquires the availability information of the specific reference signal in the second way.

In an example, if the terminal device keeps acquiring the availability information of the specific reference signal in the first way or the second way, the terminal device may acquire the availability information of the specific reference signal from the updated system information in the first way or the second way, i.e., update the availability information of the specific reference signal. In another example, if the terminal device keeps acquiring the availability information of the specific reference signal in the first way or the second way, the terminal device may also use the original availability information of the specific reference signal without acquiring it again.

It is noted that, in the example of the present application, the specific implementation procedure in which the terminal device acquires the availability information of the specific reference signal in the first way or the second way can refer to the above description of S202 in FIGS. 2 and S302 in FIG. 3, and will not be described in detail here.

For example, on the basis of the above-described example of FIG. 2, the terminal may read the availability information of the configuration resource according to the network device indication or protocol agreed way after receiving a system message update.

As an example, the system message update may result in a change in the notification way, indicating the physical layer (from no configuration to configuration, or from enabled to disabled in response to determining that there is configuration); at this time, the terminal device reads the availability information of the configuration resource according to the updated notification way indicating the physical layer.

Optionally, the terminal device may determine the availability information of the configuration resource according to the presence or absence of the configuration resource in the system message, according to protocol agreed way; after receiving the change of the notification way indicating the physical layer, the activation state of the configuration resource is obtained according to the bitmap in the system message. For example, if both the first set and the second set of resources are available, they are considered to be enabled, in response to determining that the notification way of the physical layer in the SIBx changes, then it needs to be determined that only the first set of resources is available based on the bitmap 10 in the SIBx.

Or, the terminal device may obtain the availability information of the configuration resource from the bitmap in the system message according to the protocol agreed way; after the change of the notification way indicating the physical layer is received, the availability information of the configuration resource is obtained based on the bitmap in the system message (i.e., the original obtained value needs to be updated). For example, if both the first and second set of resources are present and the bitmap is 1, they are considered to be enabled, then the notification way of the physical layer in the SIBx is changed, and only the first set of resources are available based on the bitmap 10 in the SIBx.

Furthermore, the terminal device obtains the availability information of the configuration resource from the bitmap in the system message according to the protocol agreed way; after the change of the notification way indicating the physical layer is received, the availability information originally obtained from the bitmap in the system message for the configuration resource remains available (i.e., the originally obtained value does not need to be updated and is still valid).

As another example, the system message update may result in a change in the notification way, indicating the physical layer (from configuration to no configuration, or from enabled to disabled in response to determining that there is configuration); at this time the terminal device reads the availability information of the configuration resource according to the updated notification way, indicating the physical layer.

Further, the availability information of the configuration resource does not need to be changed, i.e., the availability information of the configuration resource does not need to be retrieved, before and after the system message is updated.

Or, the terminal device acquires the activation state of the configuration resource according to the bitmap in the system message; after receiving the change of the notification way indicating the physical layer, the availability information of the configuration resource is determined according to the presence or absence of the configuration resource in the system message according to a protocol agreed way.

Further, the terminal device receives the change of the notification way indicating the physical layer, and obtains the availability information of the configuration resource based on the bitmap in the system message (i.e., the original obtained value needs to be updated).

Or, in response to determining that the terminal device receives the change of the notification way indicating the physical layer, the availability information of the configuration resource from the bitmap in the system message is still available (i.e., the original acquired value does not need to be updated and is still valid).

In an example of the disclosure, the terminal device may determine the availability information of a specific reference signal according to the availability indication based on the physical layer signaling, so that the terminal device may select a more appropriate way to synchronize with the network device, thus improving the device performance.

Figure 6:
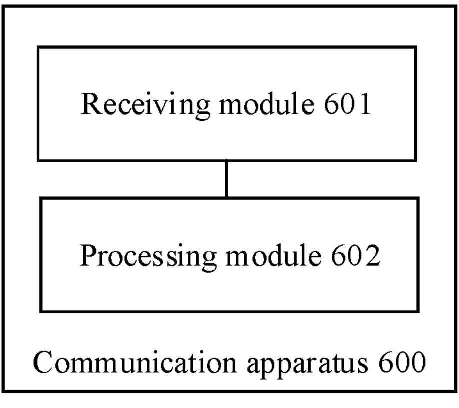
FIG. 6 is a schematic structural diagram of a communication apparatus according to an example of the disclosure.

Based on the same inventive concept, an example of the disclosure further provides a communication apparatus, which may be a terminal device or a chip or a system-on-chip in a terminal device in the above communication system, and may also be a functional module in a terminal device for implementing the method of the above respective examples. The communication apparatus may implement the functions performed by the terminal device in the above examples, and the functions may be implemented by hardware executing the corresponding software. Such hardware or software includes one or more modules corresponding to the functions described above. FIG. 6 is a schematic structural diagram of a communication apparatus according to an example of the disclosure. Referring to FIG. 6, the communication apparatus 600 includes a receiving module 601 (e.g., a first receiving module or a second receiving module) used to receive broadcast system information; a processing module 602, used to acquire availability information of a specific reference signal from the system information, the specific reference signal being used to assist the terminal device in time-frequency domain synchronization with the network device; in response to determining that the specific reference signal has been configured and the configuration information of the specific reference signal is initial activation, then the availability information indicates that the specific reference signal is available; in response to determining that the specific reference signal is not configured, or the configuration information of the specific reference signal is initial deactivation, then the availability information indicates that the specific reference signal is not available.

Here, the receiving module 601 may be understood as a first receiving module or a second receiving module; the processing module 602 may be understood as a first processing module or a second processing module.

In some possible implementations, a processing module 602 is used to, in response to determining that an availability indication based on the physical layer signaling is enabled, according to the first information in the system information, determine the availability information of the specific reference signal, the availability indication based on the physical layer signaling refers to that the terminal device acquires the availability information through the physical layer signaling, the first information is used to indicate an initial activation state of the configuration information of the specific reference signal.

In some possible implementations, the physical layer signaling is used to carry a paging downlink control indicator (DCI), or a paging early indicator (PEI), and the availability indication based on the physical layer signaling is a DCI or PEI based availability indication.

In some possible implementations, the receiving module 601 is further used to receive indication information from the network device, the indication information being used to indicate whether the availability indication based on physical layer signaling is enabled.

In some possible implementations, the processing module 602 is further used to determine whether the PEI is configured in the system information, the PEI is used to indicate whether an availability indication based on physical layer signaling is enabled; or, determine whether the first information is present in the system information, the first information is further used to indicate that the availability indication based on the physical layer signaling is enabled.

In some possible implementations, the processing module 602 is further configured to, in response to determining that the availability indication based on the physical layer signaling is disabled, determine the availability information of the specific reference signal according to whether the configuration information is configured in the system information, the availability indication based on the physical layer signaling refers to that the terminal device acquires the availability information through the physical layer signaling.

In some possible implementations, the processing module 602 is used to, in response to determining that the configuration information is configured in the system information, determine that the specific reference signal is configured in the system information, and the configuration information of the specific reference signal is initial activation; or, in response to determining that the configuration information is configured in the system information, determine that the specific reference signal is configured in the system information, and the configuration information of the specific reference signal is initial deactivation; or, in response to determining that the configuration information is not configured in the system information, determine that the configuration information of the specific reference signal is initial deactivation.

In some possible implementations, the receiving module 601 is further used to receive system information update indication information from the network device before receiving the system information, the system information update indication information being used to indicate that the availability indication based on the physical layer signaling is enabled or disabled.

In some possible implementations, the processing module 602 is used to determine the availability information of the specific reference signal according to the first information in the system information, the first information is used to indicate the initial activation state of the configuration information of the specific reference signal; or, determine the availability information of the specific reference signal according to whether the configuration information is configured in the system information.

In some possible implementations, the specific reference signal is a TRS or a CSI-RS.

It is noted that the specific implementation processes of the receiving module 601 and the processing module 602 can refer to the detailed description of the example of FIG. 2 to FIG. 5, which will not be repeated here for the sake of brevity of the description.

The receiving module 601 mentioned in the examples of the disclosure may be a receiving interface, a receiving circuit, or a receiver, etc.; the processing module 602 may be one or more processors.

Figure 7:
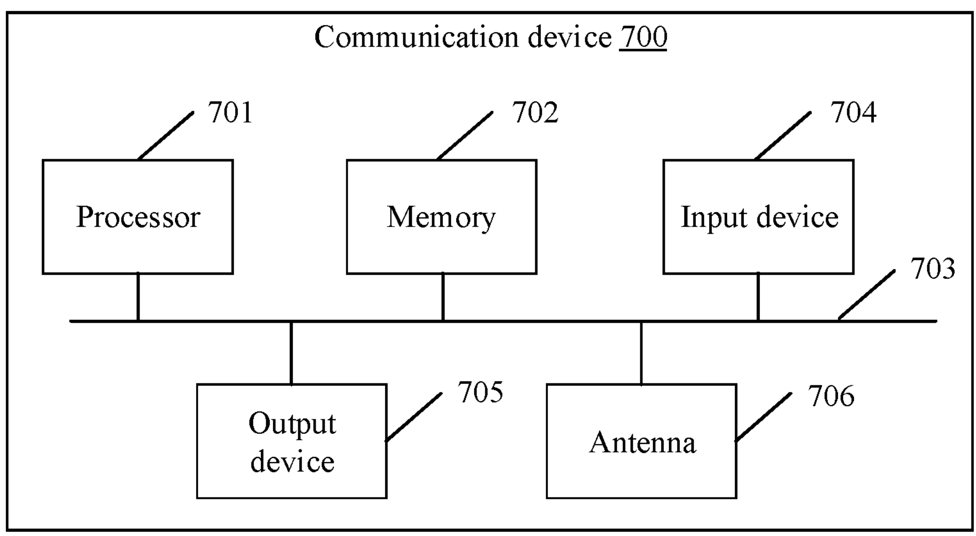
FIG. 7 is a schematic structural diagram of a communication device according to an example of the disclosure.

Based on the same inventive concept, an example of the disclosure provides a communication device, which may be a terminal device or an access network device as described in one or more examples above. FIG. 7 is a schematic structural diagram of a communication device in accordance with an example of the disclosure. Referring to FIG. 7, the communication device 700 employs general purpose computer hardware and includes a processor 701, a memory 702, a bus 703, an input device 704, an output device 705, and antenna 706.

In some possible implementations, the memory 702 can include a computer storage medium in the form of a volatile and/or nonvolatile memory, such as a read-only memory and/or a random access memory. The memory 702 may store an operating system, application programs, other program modules, executable code, program data, user data, and the like.

The input device 704 may be used to enter commands and information into the communication device the input device 704 can be a keyboard or a pointing device, such as a mouse, a trackball, a touch pad, a microphone, a joystick, a game pad, a satellite television antenna, a scanner, or the like. These input devices may be connected to the processor 701 through the bus 703.

The output device 705 may be used for the communication device to output information, in addition to a monitor, the output device 705 may also be other peripheral output devices such as a speaker and/or a printing device, which may also be connected to the processor 701 via the bus 703.

The communication device may be connected through the antenna 706 into a network, such as to a local area network (LAN). In a networked environment, computer executable instructions stored in the control device may be stored in the remote storage device, rather than being limited to local storage.

When the processor 701 in the communication device executes the executable code or the application program stored in the memory 702, the communication device performs the communication method on the terminal device side or the access network device side in the above examples, and specific execution procedures refer to the above examples, which are not described in detail here.

In addition, the memory 702 has stored computer-executable instructions for implementing the functions of the receiving module 601 and the processing module 602 in FIG. 6. The functions/implementation processes of the receiving module 601 and the processing module 602 in FIG. 6 can be implemented by the processor 701 in FIG. 7 calling the computer-executed instructions stored in the memory 702, and the specific implementation processes and functions refer to the above-described related examples.

Based on the same inventive concept, an example of the disclosure provides a terminal device, which is consistent with the terminal device in one or more examples described above. Optionally, the terminal device may be a mobile phone, a computer, a digital broadcast terminal, a messaging device, a game console, a tablet device, a medical device, a fitness device, a personal digital assistant, or the like.

Figure 8:
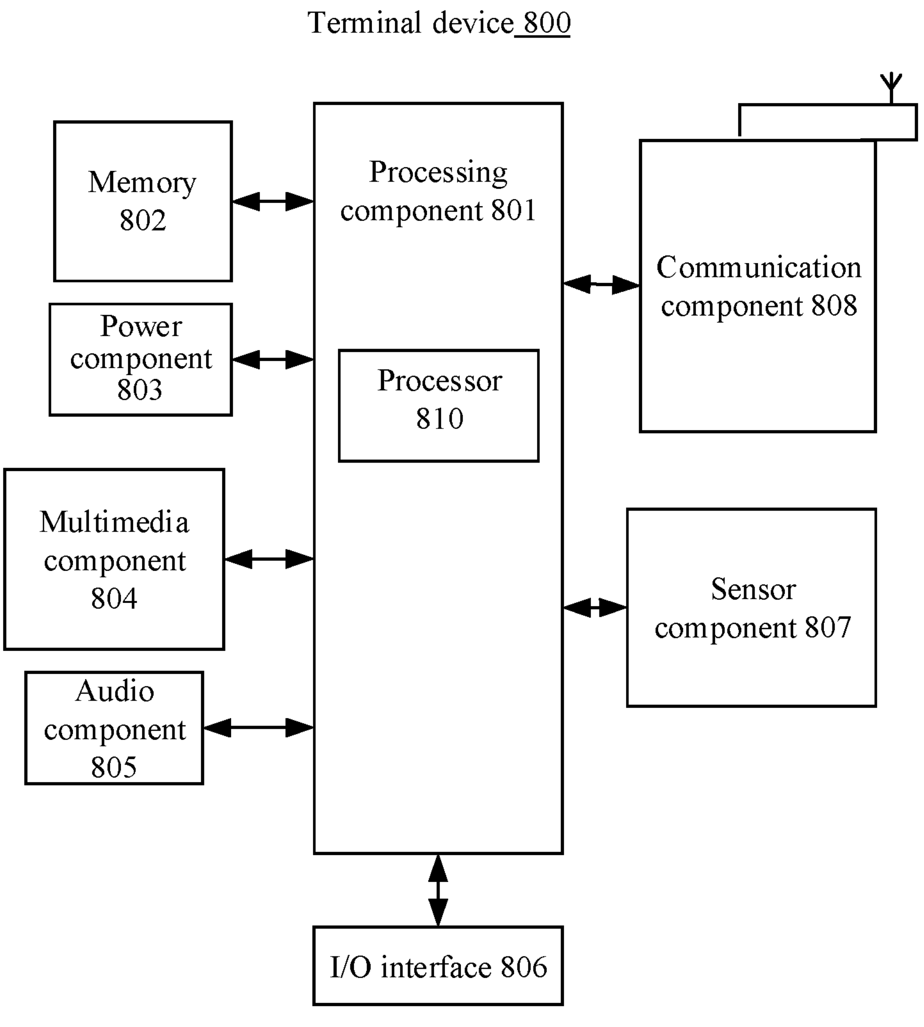
FIG. 8 is a schematic structural diagram of a terminal device according to an example of the disclosure.

FIG. 8 is a schematic structural diagram of a terminal device according to an example of the disclosure. Referring to FIG. 8, the terminal device 800 may include one or more of the following components: a processing component 801, a memory 802, a power component 803, a multimedia component 804, an audio component 805, an I/O interface 806, a sensor component 807, and a communication component 808.

The processing component 801 generally controls the overall operations of the terminal device 800, such as operations associated with display, phone calls, data communications, camera operations, and recording operations. The processing component 801 may include one or more processors 810 to execute instructions to perform all or a portion of the steps of the methods described above. Furthermore, the processing component 801 may include one or more modules that facilitate interaction between the processing component 801 and other components. For example, the processing component 801 may include a multimedia module to facilitate interaction between the multimedia component 804 and the processing component 801.

The memory 802 is used to store various types of data to support the operation of the terminal device 800. Examples of such data include instructions for any application or method operating on the terminal device 800, contact data, phonebook data, messages, pictures, videos, etc. The memory 802 may be implemented by any type or combination of volatile or non-volatile storage devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a Flash memory, a magnetic or optical disk.

The power component 803 provides power for the various components of the terminal device 800. The power component 803 can include a power management system, one or more power sources, and other components associated with generating, managing, and distributing power for the terminal device 800.

The multimedia component 804 includes a screen that provides an output interface between the terminal device 800 and the user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touches, slides, and gestures on the touch panel. The touch sensor may not only sense a boundary of a touching or swiping action, but also detect duration and pressure related to the touching or swiping operation. In some examples, the multimedia component 804 includes a front camera and/or a rear camera. When the terminal device 800 is in an operational mode, such as a shooting mode or a video mode, the front camera and/or the rear camera may receive external multimedia data. Each of the front camera and rear camera may be a fixed optical lens system or have a focal length and optical zoom capability.

The audio component 805 is configured to output and/or input audio signals. For example, the audio component 805 includes one microphone (MIC) configured to receive an external audio signal when the terminal device 800 is in an operating mode, such as a call mode, a recording mode, and a voice recognition mode. Received audio signals may be further stored in the memory 802 or transmitted via the communication component 808. In some examples, the audio component 805 also includes a speaker for outputting audio signals.

The I/O interface 806 provides an interface between the processing component 801 and peripheral interface modules, which may be a keyboard, a click wheel, buttons, and the like. These buttons may include, but are not limited to, a homepage button, a volume button, a start button, and a lock button.

The sensor component 807 includes one or more sensors for providing state assessment of various aspects for the terminal device 800. For example, the sensor component 807 may detect an open/closed state of the terminal device 800, the relative positioning of the components, such as the display and keypad of the terminal device 800, the sensor component 807 can also detect changes in the position of the terminal device 800 or a component of the terminal device 800, the presence or absence of contact by the user with the terminal device 800, the orientation or acceleration/deceleration of the terminal device 800, and changes in the temperature of the terminal device 800. The sensor component 807 may include a proximity sensor configured to detect the presence of a nearby object in the absence of any physical contact. The sensor component 807 may also include a light sensor, such as a CMOS or CCD image sensor, for use in imaging applications. In some examples, the sensor component 807 may also include an acceleration sensor, a gyro sensor, a magnetic sensor, a pressure sensor, or a temperature sensor.

The communication component 808 is configured to facilitate communication between the terminal device 800 and other devices in a wired or wireless way. The terminal device 800 may access a wireless network based on a communication standard, such as Wi-Fi, 2G, or 3G, or a combination of them. In an example, the communication component 808 receives a broadcast signal or broadcast related information from an external broadcast management system via a broadcast channel. In an example, the communication component 808 also includes a near field communication (NFC) module to facilitate short range communication. For example, the NFC module may be implemented based on a radio frequency identification (RFID) technology, an infrared data association (IrDA) technology, an ultra-wide band (UWB) technology, a Bluetooth (BT) technology, and other technologies.

In an example, the terminal device 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for performing the method described above.

Based on the same inventive concept, an example of the disclosure further provides a computer-readable storage medium, the computer-readable storage medium has instructions stored; when the instructions are run on a computer, the instructions are used to perform the communication method on the terminal device side in the one or more examples described above.

Based on the same inventive concept, an example of the disclosure further provides a computer program or a computer program product that, when the computer program product is executed on a computer, causes the computer to implement the communication method on the terminal device side in the above one or more examples.

Other examples of the disclosure will be readily conceived by those skilled in the art after taking into account the description and practicing the disclosure disclosed here. This disclosure is intended to cover any variations, uses or adaptations of the disclosure following the general principles of the disclosure and including common general knowledge or customary practice in the art to which this disclosure does not disclose. The description and examples are considered only exemplary, and the true scope and spirit of the disclosure are indicated by the following claims.

It is understood that the disclosure is not limited to the precise structures that have been described above and shown in the drawings, and that various modifications and changes can be made without departing from the scope. The scope of the disclosure is limited only by the appended claims.

Additional non-limiting embodiments of the disclosure include the following examples.

1. A communication method, including: receiving, by a terminal device, broadcast system information; and acquiring, by the terminal device, availability information of a specific reference signal from the system information according to an availability indication based on physical layer signaling, where the availability indication based on physical layer signaling refers that the terminal device acquires the availability information by means of physical layer signaling.
2. The method according to embodiment 1, where the method further includes: receiving, by the terminal device, indication information from the network device, the indication information being configured to indicate whether the availability indication based on the physical layer signaling is enabled; or determining, by the terminal device, whether a paging early indicator (PEI) is configured in the system information, the PEI being configured to indicate whether the availability indication based on the physical layer signaling is enabled; or determining, by the terminal device, whether first information is present in the system information, the first information being configured to indicate that the availability indication based on the physical layer signaling is enabled.
3. The method according to embodiment 1, where, in response to determining that the availability indication based on the physical layer signaling is enabled, acquiring, by the terminal device, the availability information of the specific reference signal from the system information according to the availability indication based on the physical layer signaling, includes determining, by the terminal device, the availability information according to second information in the system information, where the second information is configured to indicate an initial activation state of the configuration information of the specific reference signal.
4. The method according to embodiment 3, where the system information includes: a system information block SIB1 and/or SIBx for carrying configuration information of the specific reference signal, x being an integer greater than or equal to 2; where the second information is carried in the SIB1 or the SIBx.
5. The method according to embodiment 1, where, in response to determining that an availability indication based on the physical layer signaling is disabled, the method further includes determining, by the terminal device, the availability information according to whether the configuration information is configured in the system information.
6. The method according to embodiment 5, where, determining, by the terminal device, the availability information according to whether the configuration information is configured in the system information, includes: in response to determining that the configuration information is configured in the system information, determining, by the terminal device, that the specific reference signal is configured in the system information, and the configuration information of the specific reference signal is initial activation; or in response to determining that the configuration information is configured in the system information, determining, by the terminal device, that the specific reference signal is configured in the system information, and the configuration information of the specific reference signal is initial deactivation; or in response to determining that the configuration information is not configured in the system information, determining, by the terminal device, that the configuration information of the specific reference signal is initial deactivation.
7. The method according to embodiment 1, where the physical layer signaling is configured to carry a paging downlink control indicator (DCI) or PEI, and the availability indication based on the physical layer signaling is an availability indication based on the DCI or PEI.
8. The method according to embodiment 1, where, before the terminal device receives the broadcast system information, the method further includes receiving, by the terminal device, system information update indication information from a network device, the system information update indication information being configured to indicate that the availability indication based on the physical layer signaling is enabled or disabled.

9. The method according to embodiment 1, where the specific reference signal is a tracking reference signal (TRS), or a channel state information reference signal (CSI-RS).
10. A communication method, including: receiving, by a terminal device, broadcast system information; and determining, by the terminal device, availability information of a specific reference signal according to third information in the system information, where the third information is configured to indicate an initial activation state of configuration information of the specific reference signal; or determining, by the terminal device, the availability information according to whether the configuration information is configured in the system information.
11. The method according to embodiment 10, where the third information is a bitmap or a code point in the system information.
12. The method according to embodiment 10, where, determining, by the terminal device, the availability information according to whether the configuration information is configured in the system information, includes: in response to determining that the configuration information is configured in the system information, determining, by the terminal device, that the specific reference signal is configured in the system information, and the configuration information of the specific reference signal is initial activation; or in response to determining that the configuration information is configured in the system information, determining, by the terminal device, that the specific reference signal is configured in the system information, and the configuration information of the specific reference signal is initial deactivation; or in response to determining that the configuration information is not configured in the system information, determining, by the terminal device, that the configuration information of the specific reference signal is initial deactivation.
13. The method according to any one of embodiments 10-12, where the specific reference signal is a tracking reference signal (TRS), or a channel state information reference signal (CSI-RS).
14. A communication apparatus, including: a first receiving module, used to receive broadcast system information; and a first processing module, used to acquire availability information of a specific reference signal from the system information according to an availability indication based on physical layer signaling, where the availability indication based on the physical layer signaling refers that the terminal device acquires the availability information by means of the physical layer signaling.
15. The apparatus according to embodiment 14, where the first receiving module is further used to receive indication information from the network device, the indication information is used to indicate whether the availability indication based on the physical layer signaling is enabled.
16. The apparatus according to embodiment 14, where the first processing module is further used to determine whether a paging early indicator (PEI) is configured in the system information, the PEI being used to indicate whether the availability indication based on the physical layer signaling is enabled; or determine whether first information is present in the system information, the first information being used to indicate that the availability indication based on the physical layer signaling is enabled.
17. The apparatus according to embodiment 14, where the first processing module is used to determine the availability information according to second information in the system information in response to determining that the availability indication based on the physical layer signaling is enabled, where the second information is used to indicate an initial activation state of configuration information of the specific reference signal.
18. The apparatus according to embodiment 14, where the first processing module is further used to determine the availability information according to whether the configuration information is configured in the system information in response to determining that the availability indication based on the physical layer signaling is disabled.
19. The apparatus according to embodiment 18, where, the first processing module, is used to, in response to determining that the configuration information is configured in the system information, determine that the specific reference signal is configured in the system information, and the configuration information of the specific reference signal is initial activation; or, in response to determining that the configuration information is configured in the system information, determine that the specific reference signal is configured in the system information, and the configuration information of the specific reference signal is initial deactivation; or, in response to determining that the configuration information is not configured in the system information, determine that the configuration information of the specific reference signal is initial deactivation.
20. The apparatus according to embodiment 14, where the first receiving module is further used to receive system information update indication information from a network device before receiving the system information, the system information update indication information being used to indicate that the availability indication based on the physical layer signaling is enabled or disabled.
21. A communication apparatus, including: a second receiving module, used to receive broadcast system information; and a second processing module, used to determine availability information of a specific reference signal according to third information in the system information, where the third information is used to indicate an initial activation state of configuration information of the specific reference signal; or determine the availability information according to whether the configuration information is configured in the system information.
22. The apparatus according to embodiment 21, where the third information is a bitmap or a code point in the system information.
23. The apparatus according to embodiment 21, where, the second processing module, is used to, in response to determining that the configuration information is configured in the system information, determine that the specific reference signal is configured in the system information, and the configuration information of the specific reference signal is initial activation; or, in response to determining that the configuration information is configured in the system information, determine that the specific reference signal is configured in the system information, and the configuration information of the specific reference signal is initial deactivation; or, in response to determining that the configuration information is not configured in the system information, determine that the configuration information of the specific reference signal is initial deactivation.

24. A terminal device, including: a memory; a processor, connected to the memory, and configured to execute computer-executable instructions stored on the memory to implement the communication method according to any one of embodiments 1 to 13.

25. A non-transitory computer-readable storage medium, including, a processing module configured to execute computer-executable instructions stored on the non-transitory computer-readable storage medium to implement the communication method according to any one of embodiments 1 to 13.

The invention claimed is:

1. A communication method, comprising:

receiving system information transmitted by a network device, wherein the system information is configured to indicate whether an availability indication based on physical layer signaling is enabled, wherein the system information comprises at least one of system information block (SIB) 1 or SIBx, the SIBx is configured to carry configuration information for a specific reference signal, and x is an integer greater than or equal to 2; and determining whether the availability indication is enabled, comprising:

determining that the availability indication is enabled when the system information configures a bitmap or a code point; and determining that the availability indication is disabled when the system information configures neither the bitmap nor the code point, wherein the bitmap or the code point is configured to indicate an availability of the specific reference signal, wherein the method further comprises:

determining whether the specific reference signal is available based on the availability indication in response to determining that the availability indication is enabled.

2. The communication method according to claim 1, wherein the configuration information for the specific reference signal is initial deactivation.

3. The communication method according to claim 1, wherein when the availability indication is disabled, the method further comprises at least one of:

determining that the system message comprises the configuration information for the specific reference signal and the specific reference signal is unavailable; or determining that the system message does not comprise the configuration information for the specific reference signal and the specific reference signal is unavailable.

4. The communication method according to claim 1, wherein the physical layer signaling is configured to carry a paging downlink control indicator (DCI) or a paging early indicator (PEI), and the availability indication is an availability indication based on the DCI or the PEI.

5. The communication method according to claim 1, wherein the method further comprises:

receiving system information update indication information from the network device, wherein the system information update indication information is configured to indicate that the availability indication is enabled or disabled.

6. The communication method according to claim 1, wherein the configuration information for the specific reference signal is at least one of resource configuration information for a tracking reference signal (TRS) or resource configuration information for a channel state information reference signal (CSI-RS).

7. A communication method, performed by a network device, comprising:

sending system information to a terminal device, wherein the system information is configured to indicate whether an availability indication based on physical layer signaling is enabled, wherein the system information comprises at least one of system information block (SIB) 1 or SIBx, the SIBx is configured to carry configuration information for a specific reference signal, and x is an integer greater than or equal to 2, wherein the availability indication is enabled when the system information configures a bitmap or a code point, and the availability indication is disabled when the system information configures neither the bitmap nor the code point, wherein the bitmap or the code point is configured to indicate an availability of the specific reference signal.

8. The communication method according to claim 7, wherein the configuration information for the specific reference signal is at least one of resource configuration information for a tracking reference signal (TRS) or resource configuration information for a channel state information reference signal (CSI-RS).

9. The communication method according to claim 7, wherein the configuration information for the specific reference signal is initial deactivation.

10. The communication method according to claim 7, wherein the physical layer signaling is configured to carry a paging downlink control indicator (DCI) or a paging early indicator (PEI), and the availability indication is an availability indication based on the DCI or the PEI.

11. The communication method according to claim 7, further comprising:

sending system information update indication information to the terminal device, wherein the system information update indication information is configured to indicate that the availability indication is enabled or disabled.

12. A terminal device, comprising:

a memory that stores computer-executable instructions; and one or more processors that are communicatively coupled to the memory, wherein the computer-executable instructions when executed by the one or more processors cause the terminal device to:

receive system information transmitted by a network device, wherein the system information is configured to indicate whether an availability indication based on physical layer signaling is enabled, wherein the system information comprises at least one of system information block (SIB) 1 or SIBx, the SIBx is configured to carry configuration information for a specific reference signal, and x is an integer greater than or equal to 2; and determine whether the availability indication is enabled, comprising:

determining that the availability indication is enabled when the system information configures a bitmap or a code point; and determining that the availability indication is disabled when the system information configures neither the bitmap nor the code point, wherein the bitmap or the code point is configured to indicate an availability of the specific reference signal, wherein the computer-executable instructions are further configured to cause the terminal device to:

determine whether the specific reference signal is available based on the availability indication in response to determining that the availability indication is enabled.

13. The terminal device of according to claim 12, wherein the configuration information for the specific reference signal is initial deactivation.

14. The terminal device of according to claim 12, wherein when the availability indication is disabled, the computer-executable instructions are further configured to cause the terminal device to:

determine that the system message comprises the configuration information for the specific reference signal and the specific reference signal is unavailable; or determine that the system message does not comprise the configuration information for the specific reference signal and the specific reference signal is unavailable.

15. The terminal device of according to claim 12, wherein the physical layer signaling is configured to carry a paging downlink control indicator (DCI) or a paging early indicator (PEI), and the availability indication is an availability indication based on the DCI or the PEI.

16. The terminal device of according to claim 12, wherein the computer-executable instructions are further configured to cause the terminal device to:

receive system information update indication information from the network device, wherein the system information update indication information is configured to indicate that the availability indication is enabled or disabled.

17. The terminal device of according to claim 12, wherein the configuration information for the specific reference signal is at least one of resource configuration information for a tracking reference signal (TRS) or resource configuration information for a channel state information reference signal (CSI-RS).

18. A non-transitory computer-readable storage medium storing computer-executable instructions that when executed by one or more processors cause the one or more processors to execute the communication method according to the claim 1.

19. A non-transitory computer-readable storage medium storing computer-executable instructions, the computer-executable instructions when executed by one or more processors cause the one or more processors to execute the communication method according to the claim 7.

20. A network device, comprising:

a memory that stores computer-executable instructions; and one or more processors that are communicatively coupled to the memory, wherein the computer-executable instructions when executed by the one or more processors cause the network device to perform the communication method according to the claim 7.

* * * * *